(12) United States Patent
Ito et al.

(10) Patent No.: US 12,722,971 B2
(45) Date of Patent: Sep. 1, 2026

(54) HYDROGEN PRODUCTION SYSTEM

(71) Applicant: MITSUBISHI HEAVY INDUSTRIES, LTD., Tokyo (JP)

(72) Inventors: Hideki Ito, Tokyo (JP); Ichirou Toyoda, Tokyo (JP); Shuntaro Seto, Tokyo (JP); Wataru Matsubara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 442 days.

(21) Appl. No.: 18/576,305

(22) PCT Filed: Jul. 29, 2022

(86) PCT No.: PCT/JP2022/029300
§ 371 (c)(1),
(2) Date: Jan. 3, 2024

(87) PCT Pub. No.: WO2023/026768
PCT Pub. Date: Mar. 2, 2023

(65) Prior Publication Data

US 2024/0308842 A1 Sep. 19, 2024

(30) Foreign Application Priority Data

Aug. 24, 2021 (JP) ................................ 2021-136409

(51) Int. Cl.
*C01B 3/04* (2026.01)

(52) U.S. Cl.
CPC ........ *C01B 3/04* (2013.01); *C01B 2203/0266* (2013.01); *C01B 2203/0833* (2013.01)

(58) Field of Classification Search
None
See application file for complete search history.

(56) References Cited

U.S. PATENT DOCUMENTS

2009/0321244 A1 12/2009 Smith et al.
2019/0315628 A1 10/2019 Kondo et al.
2023/0141693 A1 5/2023 Ito et al.
(Continued)

FOREIGN PATENT DOCUMENTS

CA 2 944 428 A1 10/2015
JP 2009-536604 A 10/2009
JP 4775790 B2 9/2011
(Continued)

OTHER PUBLICATIONS

WO-2015159817-A1—English translation (Year: 2015).*
(Continued)

*Primary Examiner* — Stefanie J Cohen
(74) *Attorney, Agent, or Firm* — Birch, Stewart, Kolasch & Birch, LLP

(57) ABSTRACT

A hydrogen production system equipped with at least one container for housing a hydrogen compound member, a heating device for heating the inside of the at least one container by a heating medium, a cooling device for cooling the inside of the at least one container, and a water supply device for supplying water into the at least one container, the heating device being equipped with a solar collector for heating the heating medium by collecting sunlight and irradiating the heating medium.

7 Claims, 3 Drawing Sheets

(56) References Cited

U.S. PATENT DOCUMENTS

| | | | |
|---|---|---|---|
| 2023/0159324 A1 | 5/2023 | Ito et al. | |

FOREIGN PATENT DOCUMENTS

| | | | | |
|---|---|---|---|---|
| JP | 2013-126948 A | 6/2013 | | |
| JP | 2018-118892 A | 8/2018 | | |
| JP | 2019-218251 A | 12/2019 | | |
| WO | WO 2008/030277 A2 | 3/2008 | | |
| WO | WO 2010/147674 A2 | 12/2010 | | |
| WO | WO-2015159817 A1 * | 10/2015 | ............. | F03G 6/067 |
| WO | WO 2018/074518 A1 | 4/2018 | | |
| WO | WO 2021/210351 A1 | 10/2021 | | |
| WO | WO 2021/210496 A1 | 10/2021 | | |

OTHER PUBLICATIONS

Extended European Search Report for European Application No. 22861059.8, dated Apr. 22, 2025.

International Preliminary Report on Patentability and Written Opinion of the International Searching Authority for International Application No. PCT/JP2022/029300, dated Mar. 7, 2024, with an English translation.

International Search Report for International Application No. PCT/JP2022/029300, dated Sep. 20, 2022, with English translation.

Japanese Office Action for Japanese Application No. 2021-136409, dated Apr. 11, 2023, with English translation.

Japanese Office Action for Japanese Application No. 2021-136409, dated Jul. 25, 2023, with English translation.

Kondo, "Generation of borophane, a new two-dimensional substance composed of hydrogen and boron," JXTG Technical Review, vol. 60, No. 2, 2018, pp. 9-13.

Nishino et al., "Formation and Characterization of Hydrogen Boride Sheets Derived from MgB2 by Cation Exchange," Journal of the American Chemical Society, vol. 139, Sep. 19, 2017, pp. 13761-13769.

* cited by examiner 1
2
3
5
6
7
8
9
10(4)
11(4)
20
21
22
23
24
25
26

1
2a
9a
3
30a
31a
32a
33a
34a
2b
9b
3
30b
31b
32b
33b
34b
2c
9c
3
30c
31c
32c
33c
34c
22
10(4)
21
20
23
24
25
26
11(4)

HYDROGEN PRODUCTION SYSTEM

TECHNICAL FIELD

The present disclosure relates to a hydrogen production system.

The present application claims priority based on Japanese Patent Application No. 2021-136409 filed in Japan on Aug. 24, 2021, the contents of which are incorporated herein by reference.

BACKGROUND ART

PTL 1 discloses a system of electrolyzing seawater using a DC generated by a solar power generation device to generate a hydrogen gas.

CITATION LIST

Patent Literature

[PTL 1] International Publication No. 2015/159817

SUMMARY OF INVENTION

Technical Problem

However, a method of electrolyzing seawater using a DC generated by a solar power generation device has a problem that thermal efficiency of hydrogen production is low.

In view of the above circumstances, an object of at least one embodiment of the present disclosure is to provide a hydrogen production system capable of producing hydrogen with excellent thermal efficiency.

Solution to Problem

In order to achieve the above object, a hydrogen production system according to the present disclosure includes at least one container which accommodates a hydrogen compound member, a heating device which heats an inside of the at least one container by a heat medium, a cooling device which cools the inside of the at least one container, and a water supply device which supplies water into the at least one container, and the heating device includes a sunlight focusing device which heats the heat medium by focusing sunlight and emitting to the heat medium.

Advantageous Effects of Invention

According to the hydrogen production system of the present disclosure, the heat medium heated by emitting the focused sunlight heats the hydrogen compound member accommodated in the container, and accordingly, the hydrogen can be produced with excellent thermal efficiency.

DESCRIPTION OF EMBODIMENTS

Hereinafter, a hydrogen production system according to an embodiment of the present disclosure will be described with reference to the drawings. The embodiment described below shows one aspect of the present disclosure and is not to limit the present disclosure, and any change can be made within the scope of the technical idea of the present disclosure.

Embodiment 1

<Configuration of Hydrogen Production System According to Embodiment 1 of Present Disclosure>

Figure 1:
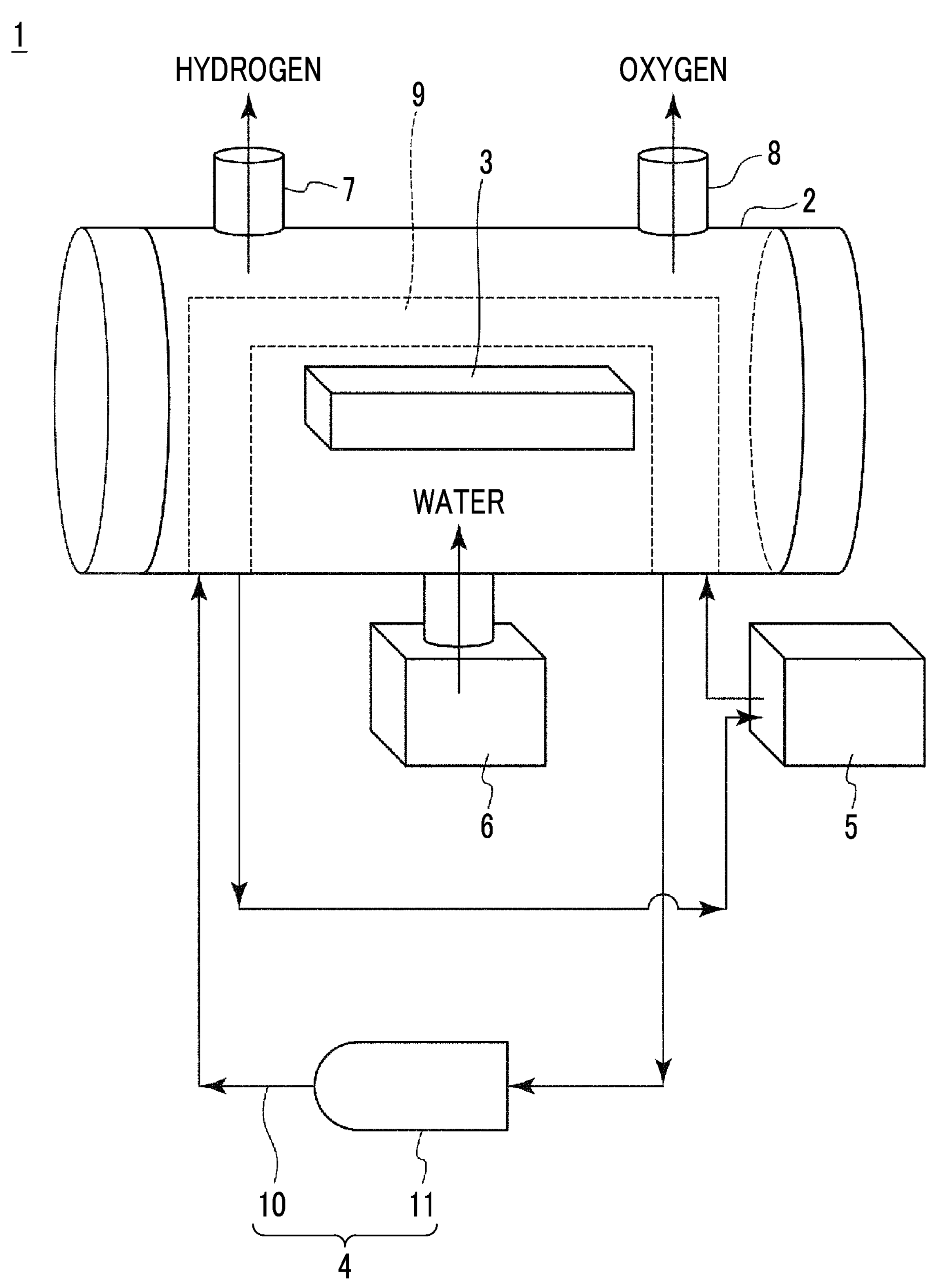
FIG. 1 is a schematic configuration diagram of a hydrogen production system according to Embodiment 1 of the present disclosure.

As shown in FIG. 1, a hydrogen production system 1 according to Embodiment 1 of the present disclosure includes a container 2 which accommodates a hydrogen compound member 3, a heating device 4 that heats an inside of the container 2, a cooling device 5 which cools the inside of the container 2, and a water supply device 6 which supplies water into the container 2. As described in an operation which will be described later, hydrogen or oxygen is generated in the container 2, and a hydrogen release unit 7 and an oxygen release unit 8 through which hydrogen and oxygen are released from the container 2, respectively, are provided on the container 2.

When an element other than hydrogen (H) is defined as X, the hydrogen compound member 3 has a two-dimensional arrangement of a hydrogen compound represented by a chemical formula $X_mH_n$, and a stoichiometric ratio m:n is 1:1 to 3:4 (for example, XH, $XH_2$, $XH_3$, $XH_4$, $X_2H_3$, or $X_3H_4$). Although not limited, the element X is, for example, boron (B).

The heating device 4 is for heating the inside of the container 2, that is, the hydrogen compound member 3 accommodated in the container 2. The heating device 4 may be configured such that a heat medium comes into direct contact with the hydrogen compound member 3 by supplying the heat medium into the container 2. However, hereinafter, the heating device 4 will be described as having a configuration in which the hydrogen compound member 3 accommodated in the container 2 is heated by causing the heat medium to flow through a heat medium passage 9 such as a jacket or a passage provided to cover an outer surface of the container 2 and exchanging heat between the heat medium and a gas in the container 2. The heat medium is not particularly limited, but a liquid heat medium such as water or oil is preferably used.

The heating device 4 includes a heat medium circulation line 10 having one end connected to an inlet of the heat medium passage 9 and the other end connected to an outlet of the heat medium passage 9 to circulate the heat medium, and a sunlight focusing device 11 which heats the heat medium by focusing and emitting sunlight to the heat medium which circulates through the heat medium circulation line 10. The configuration of the sunlight focusing device 11 is not particularly limited, and for example, any type of device such as a parabolic trough, a solar power generation tower, and a parabolic dish can be used, but in consideration of a maximum heating temperature, cost, and the like, parabolic trough type device is preferable.

The cooling device 5 is for cooling the inside of the container 2, that is, the hydrogen compound member 3 accommodated in the container 2. The configuration of the cooling device 5 is not particularly limited, and for example, a refrigerant type cooling device such as an air cooler or a water cooler can be used. In a case where the cooling device 5 is of a refrigerant type, a refrigerant such as cooling air or water may flow through the heat medium passage 9, or may be supplied into the container 2. In addition, immediately after the heating of the inside of the container 2 is completed, an outside temperature of the container 2 is lower than an internal temperature of the container 2, and therefore, if the inside of the container 2 is opened to the outside of the container 2, the inside of the container 2 can be cooled. Accordingly, an on/off valve capable of opening and closing the inside of the container 2 to the outside of the container 2 can also be set as the cooling device 5.

The water supply device 6 is for supplying a fluid containing liquid water, steam, or at least one of water or steam as a main component (hereinafter, simply referred to as "water" as a component meaning all of these) into the container 2. If a temperature of the water is close to a cooling temperature of the cooling device 5, the inside of the container 2 can be cooled by the supplied water, and in this case, the water supply device 6 can also serve as the cooling device 5.

<Operation of Hydrogen Production System According to Embodiment 1 of Present Disclosure>

Next, an operation of the hydrogen production system 1 according to Embodiment 1 of the present disclosure will be described. The hydrogen production system 1 operates to switch an operation of driving the heating device 4 and stopping the cooling device 5 and the water supply device 6 to release hydrogen (hydrogen release operation) and an operation of stopping the heating device 4 and driving the cooling device 5 and the water supply device 6 to store hydrogen (hydrogen storage operation) to each other.

First, the hydrogen release operation will be described. The hydrogen compound member 3 accommodated in the container 2 is in a state of storing hydrogen. In order to release hydrogen, the heating device 4 is driven. The heat medium is heated by irradiating the heat medium circulating through the heat medium circulation line 10 with sunlight focused by the sunlight focusing device 11 by a pump (not shown) or the like. The heated heat medium exchanges heat with the gas in the container 2 when flowing through the heat medium passage 9, so that the hydrogen compound member 3 accommodated in the container 2 is heated. When a temperature of the hydrogen compound member 3 is in a range of about 150° C. to about 300° C., hydrogen is released from the hydrogen compound member 3. The hydrogen released from the hydrogen compound member 3 is caused to flow out from the container 2 through the hydrogen release unit 7, thereby collecting the hydrogen.

Next, the hydrogen storage operation will be described. By driving the cooling device 5 in a state where the heating device 4 is stopped, a temperature of the inside of the container 2 is controlled to be lower than about 150° C., preferably about 80° C. or higher and lower than about 150° C. When the water supply device 6 supplies water into the container 2 in this state, the water is decomposed into hydrogen and oxygen in the presence of the hydrogen compound member 3, and hydrogen is absorbed in the hydrogen compound member 3. Accordingly, the hydrogen compound member 3 is in a state of storing hydrogen. The oxygen is retained in the container 2, but the oxygen is caused to flow out from the container 2 through the oxygen release unit 8, thereby collecting the oxygen.

As described above, in the hydrogen production system 1 of the present disclosure, the heat medium heated by emitting the focused sunlight heats the hydrogen compound member 3 accommodated in the container 2, and accordingly, the hydrogen can be produced with excellent thermal efficiency.

<Modification Example of Hydrogen Production System According to Embodiment 1 of Present Disclosure>

In Embodiment 1, each of hydrogen and oxygen is released from the container 2 through separate release unit, that is, the hydrogen release unit 7 and the oxygen release unit 8, but is not limited to this embodiment. The hydrogen release unit 7 and the oxygen release unit 8 may be changed to one common release port, and this release port may be changed to a supply destination of hydrogen and oxygen.

Embodiment 2

Next, a hydrogen production system according to Embodiment 2 will be described. In the hydrogen production system according to Embodiment 2, a heat storage unit which stores some of the heat of the heat medium heated by sunlight is added to Embodiment 1. In Embodiment 2, the same reference numerals are used for the same constituent elements of Embodiment 1 and the specific description is omitted.

<Configuration of Hydrogen Production System According to Embodiment 2 of Present Disclosure>

Figure 2:
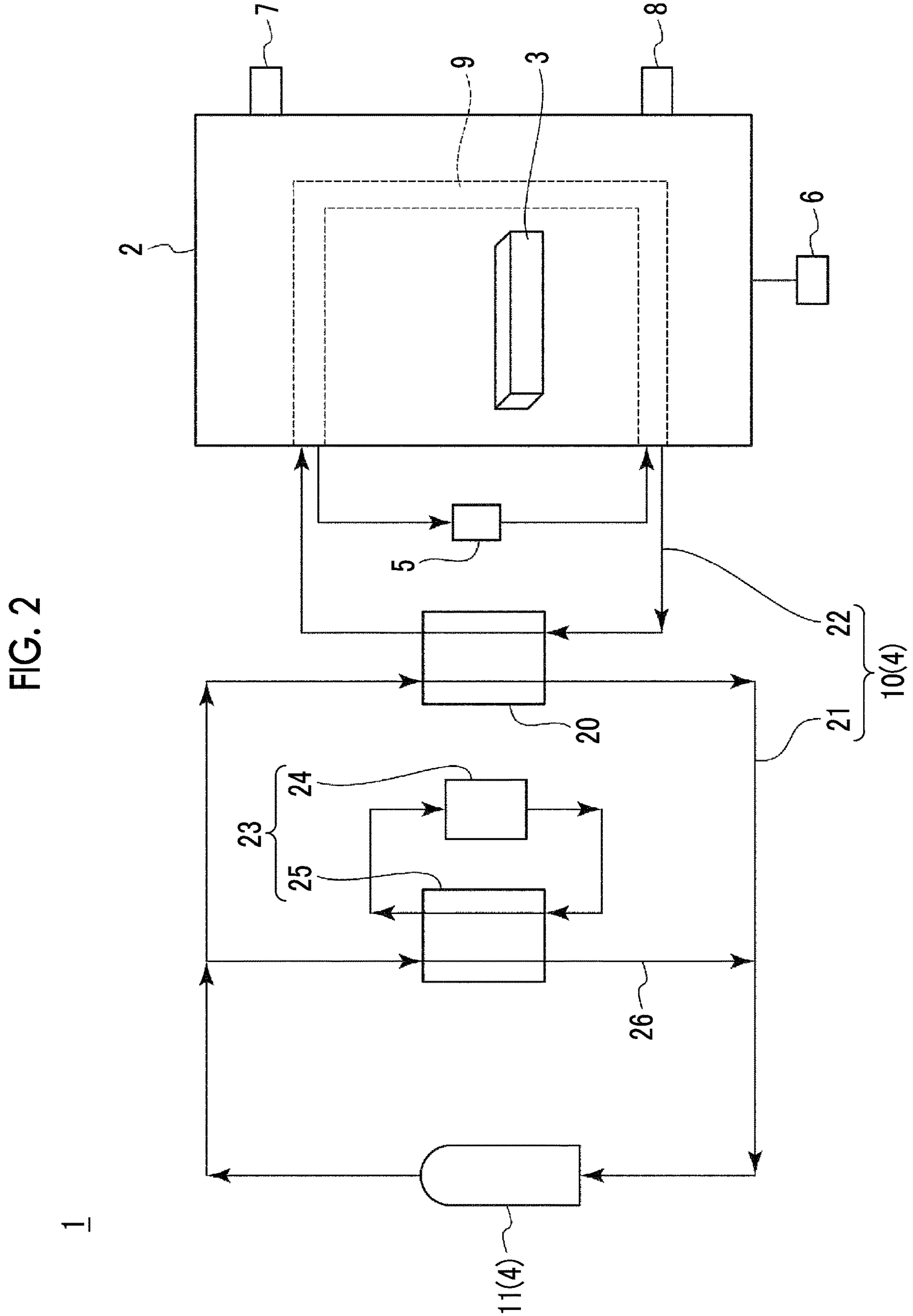
FIG. 2 is a schematic configuration diagram of a hydrogen production system according to Embodiment 2 of the present disclosure.

As shown in FIG. 2, in the hydrogen production system 1 according to Embodiment 2 of the present disclosure, the heat medium is configured with a first heat medium irradiated with sunlight by the sunlight focusing device 11, and a second heat medium for heating the inside of the container 2. The first heat medium and the second heat medium may be the same fluid or different fluids.

The heat medium circulation line 10 includes a first heat medium circulation line 21 through which the first heat medium circulates, and a second heat medium circulation line 22 through which the second heat medium circulates. The hydrogen production system 1 includes a first heat exchanger 20 which exchanges heat between the first heat medium which circulates through the first heat medium circulation line 21 and a second heat medium which circulates through the second heat medium circulation line 22. In addition, the hydrogen production system 1 includes a heat storage unit 23 capable of storing some of the heat of the first heat medium and releasing the stored heat to the first heat medium. The heat storage unit 23 includes a heat storage medium accommodation unit 24 which accommodates a heat storage medium, and a second heat exchanger 25 which exchanges heat between the first heat medium and the heat storage medium which flows through a bypass line 26 through which the first heat medium bypasses the first heat exchanger 20. The heat storage medium may be a fluid same as or different from the first heat medium or the second heat medium. Other configurations are the same as those in Embodiment 1.

<Operation of Hydrogen Production System According to Embodiment 2 of Present Disclosure>

Next, an operation of the hydrogen production system 1 according to Embodiment 2 of the present disclosure will be described. The first heat medium is heated by irradiating the first heat medium circulating through the first heat medium circulation line 21 with sunlight focused by the sunlight focusing device 11. In the first heat exchanger 20, the second heat medium is heated by exchanging heat between the first heat medium and the second heat medium. The second heat medium circulating through the second heat medium circulation line 22 heats the inside of the container 2 by exchanging heat with the gas in the container 2 when flowing through the heat medium passage 9. Accordingly, the hydrogen compound member 3 in a state of storing hydrogen is heated so that the hydrogen is released from the hydrogen compound member 3. The operation of collecting the hydrogen released from the hydrogen compound member 3 is the same as that of Embodiment 1.

While the first heat medium circulates through the first heat medium circulation line 21, some of the first heat medium flows through the bypass line 26 to bypass the first heat exchanger 20. The first heat medium flowing through the bypass line 26 exchanges heat with the heat storage medium in the second heat exchanger 25, so that some of the heat of the first heat medium is moved to the heat storage medium. By continuing this operation until sunset, the heat storage medium storing some of the heat of the first heat medium is stored in the heat storage medium accommodation unit 24.

In Embodiment 1, since the heat medium cannot be heated at night after sunset, the hydrogen release operation cannot be performed. However, in Embodiment 2, the heat of the heat storage medium and the first heat medium are exchanged in the second heat exchanger 25 even at night, so that the heat stored in the heat storage medium can be moved to the first heat medium, thereby heating the first heat medium. The heated first heat medium and second heat medium exchange heat in the first heat exchanger 20 to heat the second heat medium, and the hydrogen compound member 3 is heated by the second heat medium, thereby releasing hydrogen from the hydrogen compound member 3. Such a hydrogen release operation is not limited to the night, and as long as the heat is stored in the heat storage unit 23, the hydrogen release operation can be performed even when an intensity of sunlight is weak such as when it is cloudy or rainy.

The hydrogen storage operation is performed in the same operation as in Embodiment 1 by stopping the heating device 4 and driving the cooling device 5 and the water supply device 6.

As described above, even when it is cloudy or rainy or even at night, the first heat medium and the second heat medium can be heated by releasing heat stored in the heat storage unit 23 to the first heat medium, and accordingly, it is possible to produce hydrogen with excellent thermal efficiency regardless of the weather or time.

Embodiment 3

Next, a hydrogen production system according to Embodiment 3 will be described. In the hydrogen production system according to Embodiment 3, a configuration is changed to provide a plurality of containers 2 accommodating the hydrogen compound member 3 thereby adjusting the number of containers 2 for performing the hydrogen release operation according to the amount of heat from sunlight, compared to Embodiment 1 or 2. Hereinafter, an embodiment in which such changes are made to Embodiment 2 will be described as Embodiment 3, but Embodiment 3 can also be configured by making such changes to Embodiment 1. In Embodiment 3, the same reference numerals are used for the same constituent elements of Embodiment 2 and the specific description is omitted.

<Configuration of Hydrogen Production System According to Embodiment 3 of Present Disclosure>

Figure 3:
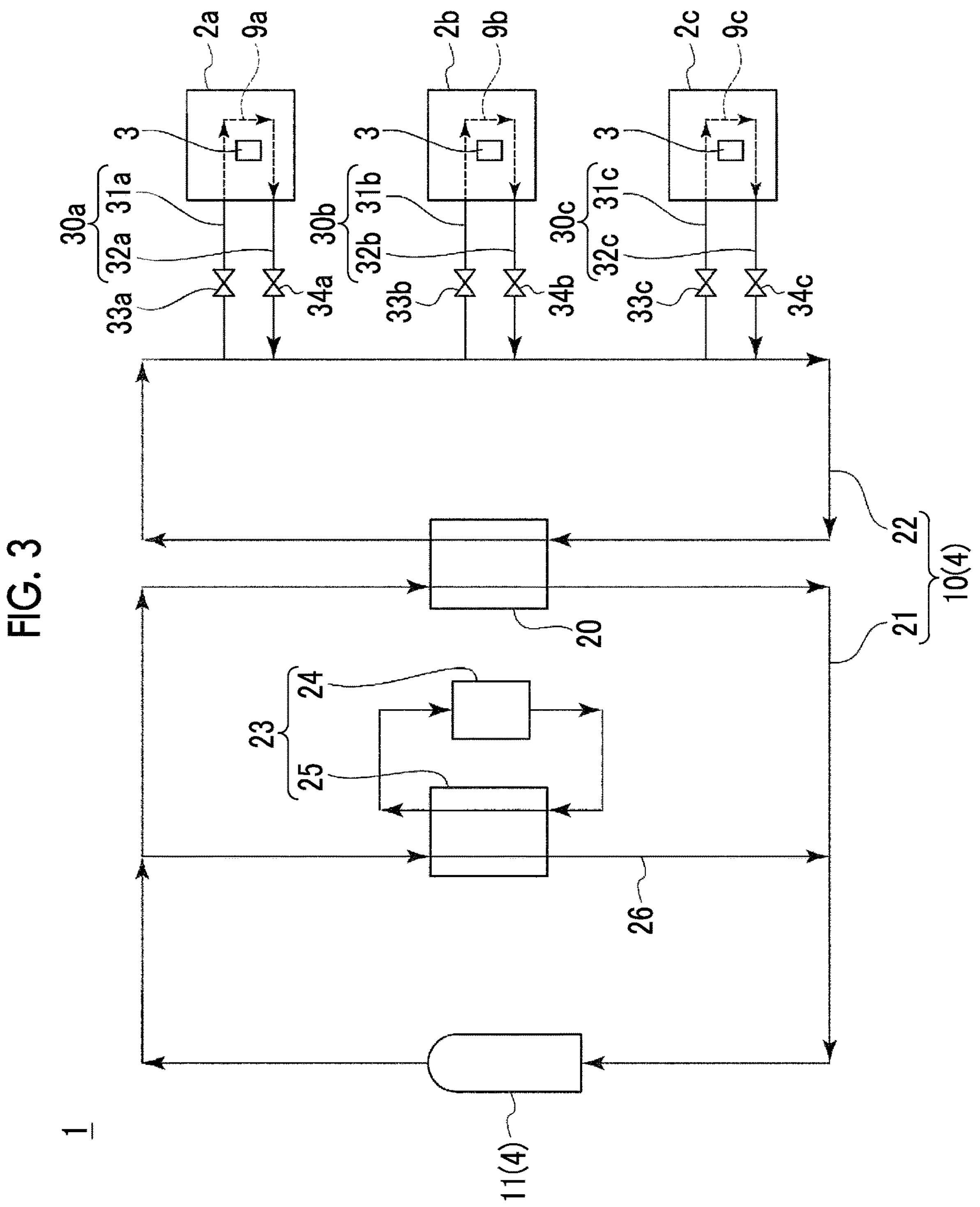
FIG. 3 is a schematic configuration diagram of a hydrogen production system according to Embodiment 3 of the present disclosure.

As shown in FIG. 3, in the hydrogen production system 1 according to Embodiment 3 of the present disclosure, the plurality of containers 2, for example, three containers 2*a*, 2*b*, and 2*c* are provided, and the hydrogen compound member 3 is accommodated in each container. Branch lines 30*a*, 30*b*, and 30*c* connected to respective inlets and outlets of heat medium passages 9*a*, 9*b*, and 9*c* of the containers 2*a*, 2*b*, and 2*c* are provided to communicate with the second heat medium circulation line 22. Specifically, the branch lines 30*a*, 30*b*, and 30*c* respectively include heat medium supply lines 31*a*, 31*b*, and 31*c* each having one end branched from the second heat medium circulation line 22 and the other end connected to an inlet of each of the heat medium passages 9*a*, 9*b*, and 9*c*, and heat medium return lines 32*a*, 32*b*, and 32*c* each having one end connected to an outlet of each of the heat medium passages 9*a*, 9*b*, and 9*c* and the other end joining the second heat medium circulation line 22.

First on/off valves 33*a*, 33*b*, and 33*c* are provided on the heat medium supply lines 31*a*, 31*b*, and 31*c*, respectively, and second on/off valves 34*a*, 34*b*, and 34*c* are provided on the heat medium return lines 32*a*, 32*b*, and 32*c*, respectively. Although will be specifically described in the following operation, it is possible to switch the second heat medium circulating through the second heat medium circulation line 22 to flow or not to flow through the branch lines 30*a*, 30*b*, and 30*c*, by opening or closing the first on/off valves 33*a*, 33*b*, and 33*c* and the second on/off valves 34*a*, 34*b*, and 34*c*, and therefore, the first on/off valves 33*a*, 33*b*, and 33*c* and the second on/off valves 34*a*, 34*b*, and 34*c* configure a switching unit. The switching unit may be only the first on/off valves 33*a*, 33*b*, and 33*c* or only the second on/off valves 34*a*, 34*b*, and 34*c*. Other configurations are the same as those in Embodiment 2.

<Operation of Hydrogen Production System According to Embodiment 3 of Present Disclosure>

An operation of heating the first heat medium with the sunlight focused by the sunlight focusing device 11, an operation of heating the second heat medium with the heat of the first heat medium, and an operation of storing some of the heat of the first heat medium by the heat storage unit 23 are the same as those of Embodiment 2. The second heat medium circulating through the second heat medium circulation line 22 flows through the heat medium passage 9*a* of the container 2*a* by opening the first on/off valve 33*a* and the second on/off valve 34*a*, and the hydrogen compound member 3 accommodated in the container 2*a* can be heated to release hydrogen. In the same manner, the hydrogen can be released from the hydrogen compound member 3 accommodated in the container 2*b* by opening the first on/off valve 33*b* and the second on/off valve 34*b*, and the hydrogen can be released from the hydrogen compound member 3 accommodated in the container 2*c* by opening the first on/off valve 33*c* and the second on/off valve 34*c*.

By adjusting the opening and closing of the first on/off valves 33*a*, 33*b*, and 33*c* and the second on/off valves 34*a*, 34*b*, and 34*c*, it is possible to switch the release of hydrogen from the hydrogen compound member 3 accommodated in one container of the three containers, the release of hydrogen from the hydrogen compound member 3 accommodated in each of two containers of the three containers, and the release of hydrogen from the hydrogen compound member 3 accommodated in each of the three containers. That is, the amount of hydrogen released can be adjusted in three stages. This adjustment can be performed according to the amount of heat from the sunlight. Other operations are the same as those in Embodiment 2.

As described above, since the number of containers 2*a*, 2*b*, and 2*c* which supply the second heat medium can be adjusted according to the amount of sunlight focused by the sunlight focusing device 11, it is possible to improve operating efficiency of the hydrogen production system 1.

<Modification Example of Hydrogen Production System According to Embodiment 3 of Present Disclosure>

The mass of the hydrogen compound member 3 accommodated in each of at least two containers of the containers 2*a*, 2*b*, and 2*c* may be different. Preferably, the mass of the hydrogen compound member 3 accommodated in each of the containers 2*a*, 2*b*, and 2*c* may be different. In Embodiment 3, the amount of hydrogen released can be adjusted in three stages. However, according to such a modification example, the amount of hydrogen production can be adjusted in stages more than three stages according to the amount of focused sunlight.

For example, the contents described in each embodiment are understood as follows.

[1] A hydrogen production system according to one aspect including at least one container (2) which accommodates a hydrogen compound member (3), a heating device (4) which heats an inside of the at least one container (2) by a heat medium, a cooling device (5) which cools the inside of the at least one container (2), and a water supply device (6) which supplies water into the at least one container (2), in which the heating device (4) includes a sunlight focusing device (11) which heats the heat medium by focusing sunlight and emitting to the heat medium.

According to the hydrogen production system of the present disclosure, the heat medium heated by emitting the focused sunlight heats the hydrogen compound member accommodated in the container, and accordingly, the hydrogen can be produced with excellent thermal efficiency.

[2] The hydrogen production system of another aspect according to [1], further including a heat storage unit (23), in which the heat storage unit (23) stores some of heat of the heat medium and releases the heat stored in the heat storage unit to the heat medium.

According to such a configuration, even when it is cloudy or rainy or even at night, the heat medium can be heated by releasing heat stored in the heat storage unit to the heat medium, and accordingly, it is possible to produce hydrogen with excellent thermal efficiency regardless of the weather or time.

[3] The hydrogen production system of still another aspect according to [2], in which the heat medium includes a first heat medium irradiated with sunlight by the sunlight focusing device (11), and a second heat medium which is heated by exchanging heat with the first heat medium and heats the inside of the at least one container (2), the hydrogen production system (1) includes a first heat exchanger (20) which exchanges heat between the first heat medium and the second heat medium, and the heat storage unit (23) includes a heat storage medium accommodation unit (24) which accommodates a heat storage medium, and a second heat exchanger (25) which exchanges heat between the first heat medium and the heat storage medium.

According to such a configuration, even when it is cloudy or rainy or even at night, the first heat medium and the second heat medium can be heated by releasing heat stored in the heat storage unit to the first heat medium, and accordingly, it is possible to produce hydrogen with excellent thermal efficiency regardless of the weather or time.

[4] The hydrogen production system of still another aspect according to any one of [1] to [3], in which the at least one container (2) includes a plurality of containers (2*a*, 2*b*, 2*c*), and the hydrogen production system (1) includes a heat medium circulation line (10) through which the heat medium flows, a branch line (30*a*, 30*b*, 30*c*) which branches from the heat medium circulation line (10) and joins the heat medium circulation line (10) again through each container (2*a*, 2*b*, 2*c*), and a switching unit (first on/off valves 33*a*, 33*b*, 33*c*/second on/off valves 34*a*, 34*b*, 34*c*) which is provided on each branch line (30*a*, 30*b*, 30*c*) and switches between flowing of the heat medium through the branch line (30*a*, 30*b*, 30*c*) and not allowing the heat medium to flow through the branch line.

According to such a configuration, since the number of containers which supply the heat medium can be adjusted according to the amount of sunlight focused by the sunlight focusing device, it is possible to improve operating efficiency of the hydrogen production system.

[5] The hydrogen production system of still another aspect according to [4], in which a mass of the hydrogen compound member (3) accommodated in each of at least two containers of the plurality of containers (2*a*, 2*b*, 2*c*) is different.

According to such a configuration, the amount of hydrogen production can be finely adjusted according to the amount of heat of the focused sunlight.

[6] The hydrogen production system of still another aspect according to any one of [1] to [5], in which, when an element other than hydrogen is defined as X, the hydrogen compound member (3) has a two-dimensional arrangement of a hydrogen compound represented by a chemical formula $X_mH_n$, and a stoichiometric ratio m:n is 1:1 to 3:4.

According to such a configuration, hydrogen can be stored and released.

[7] The hydrogen production system of still another aspect according to [6], in which the element X is boron.

According to such a configuration, hydrogen can be stored and released.

REFERENCE SIGNS LIST

1 Hydrogen production system
2, 2*a*, 2*b*, 2*c* Container
3 Hydrogen compound member
4 Heating device
5 Cooling device
6 Water supply device
10 Heat medium circulation line
11 Sunlight focusing device
20 First heat exchanger
23 Heat storage unit
24 Heat storage medium accommodation unit
25 Second heat exchanger
30*a*, 30*b*, 30*c* Branch line
33*a*, 33*b*, 33*c* First on/off valve (switching unit)
34*a*, 34*b*, 34*c* Second on/off valve (switching unit)

The invention claimed is:

1. A hydrogen production system comprising:

at least one container which accommodates a hydrogen compound member;

a heating device which heats an inside of the at least one container by a heat medium;

a cooling device which cools the inside of the at least one container; and a water supply device which supplies water into the at least one container, wherein the heating device includes a sunlight focusing device which heats the heat medium by focusing sunlight and emitting to the heat medium.

2. The hydrogen production system according to claim 1, further comprising:

a heat storage unit, wherein the heat storage unit stores some of heat of the heat medium and releases the heat stored in the heat storage unit to the heat medium.

3. The hydrogen production system according to claim 2, wherein the heat medium includes a first heat medium irradiated with sunlight by the sunlight focusing device, and a second heat medium which is heated by exchanging heat with the first heat medium and heats the inside of the at least one container, the hydrogen production system includes a first heat exchanger which exchanges heat between the first heat medium and the second heat medium, and the heat storage unit includes a heat storage medium accommodation unit which accommodates a heat storage medium, and a second heat exchanger which exchanges heat between the first heat medium and the heat storage medium.

4. The hydrogen production system according to claim 1, wherein the at least one container includes a plurality of containers, and the hydrogen production system includes a heat medium circulation line through which the heat medium circulates, a branch line which branches from the heat medium circulation line and joins the heat medium circulation line again through each container, and a switching unit which is provided on each branch line and switches between flowing of the heat medium through the branch line and not allowing the heat medium to flow through the branch line.

5. The hydrogen production system according to claim 4, wherein a mass of the hydrogen compound member accommodated in each of at least two containers of the plurality of containers is different.

6. The hydrogen production system according to claim 1, wherein, when an element other than hydrogen is defined as X, the hydrogen compound member has a two-dimensional arrangement of a hydrogen compound represented by a chemical formula $X_mH_n$, and a stoichiometric ratio min is 1:1 to 3:4.

7. The hydrogen production system according to claim 6, wherein the element X is boron.

* * * * *